United States Patent
Ono et al.

(10) Patent No.: US 8,336,601 B2
(45) Date of Patent: Dec. 25, 2012

(54) SAFETY DOOR AUTOMATIC OPENING/CLOSING DEVICE IN INJECTION MOLDING MACHINE AND THE LIKE AND METHOD OF CONTROLLING THE SAME

(75) Inventors: Hidenobu Ono, Yamaguchi (JP); Koji Ogawa, Yamaguchi (JP)

(73) Assignee: Ube Machinery Corporation, Ltd. (JP)

( * ) Notice: Subject to any disclaimer, the term of this patent is extended or adjusted under 35 U.S.C. 154(b) by 347 days.

(21) Appl. No.: 12/812,502

(22) PCT Filed: Dec. 15, 2008

(86) PCT No.: PCT/JP2008/073147
§ 371 (c)(1),
(2), (4) Date: Jul. 12, 2010

(87) PCT Pub. No.: WO2009/090830
PCT Pub. Date: Jul. 23, 2009

(65) Prior Publication Data
US 2010/0287841 A1    Nov. 18, 2010

(30) Foreign Application Priority Data

Jan. 16, 2008    (JP) ................... 2008-006899

(51) Int. Cl.
*B22D 17/32*    (2006.01)
*B29C 45/84*    (2006.01)
(52) U.S. Cl. .............. 164/153; 164/152; 425/151
(58) Field of Classification Search .......... 164/152–153; 425/151
See application file for complete search history.

(56) References Cited

FOREIGN PATENT DOCUMENTS

| | | |
|---|---|---|
| JP | 7-232360 A | 9/1995 |
| JP | 8-25448 A | 1/1996 |
| JP | 2006-150384 A | 6/2006 |

*Primary Examiner* — Kuang Lin
(74) *Attorney, Agent, or Firm* — DLA Piper LLP (US)

(57) ABSTRACT

A safety door automatic opening/closing device is capable of freely (arbitrarily) setting and controlling the opening/closing speed and the open position to shorten a waiting time required to open/close a safety door and capable of eliminating a touch switch; and a method of controlling the same.

6 Claims, 7 Drawing Sheets

(A) SET SPEED PATTERN OF SAFETY DOOR CLOSING OPERATION (B) SET SPEED PATTERN OF SAFETY DOOR OPENING OPERATION

SAFETY DOOR AUTOMATIC OPENING/CLOSING DEVICE IN INJECTION MOLDING MACHINE AND THE LIKE AND METHOD OF CONTROLLING THE SAME

CROSS-REFERENCE TO RELATED APPLICATIONS

The present invention takes priority from Japanese Patent Application No. 2008-006899 filed on Jan. 16, 2008, the entire contents of which are incorporated herein as reference and continued in the subject application.

TECHNICAL FIELD

The present invention relates to a safety door automatic opening/closing device in an injection molding machine for molding a plastic product, a die cast machine for molding an aluminum product, etc., and a method of controlling the same.

BACKGROUND ART

An injection molding machine and a die cast machine mainly include a mold clamping device and an injection device. A mold including a fixed mold and a movable mold is closed by a mold clamping device and a cavity, which is a hollow space having the shape of a product, is formed therein, and plastic or aluminum in a molten state is injected into and filled in the cavity by the injection device and after the molten material has cooled and solidified, the mold is opened and a molded article (product) is obtained.

The mold clamping device opens/closes a mold by reciprocating the movable mold and is capable of exerting a strong mold clamping force in the state where the mold is closed. By exerting the mold clamping force, it is possible to prevent the mold from opening while resisting the pressure under which plastic, etc., in the molten state is injected into and filled in the mold. Further, the structure is such that it is possible for an operator to remove the molded product from the movable mold and take the molded product out of the machine in the state where the mold is open.

As described above, the mold clamping device is operated to open/close the mold and exerts the mold clamping force, and therefore, the device is surrounded by a door, etc., to prevent an operator from entering the device during molding. A door includes a fixed door attached fixedly and a safety door that can be opened/closed to allow a molded product to be taken out of the machine and a mold to be carried in/out in the transverse direction using a set-up device. A horizontal type mold clamping device has a structure in which the safety door is located in the transverse direction of the mold, a wheel, etc., is attached to the safety door, and the safety door can be slid (opened/closed) in the reciprocating direction of the movable mold.

In a molding process, in order to take out a molded product from the machine in the transverse direction, it is necessary to open/close the safety door each cycle, which requires a lot of labor for an operator to open/close the safety door (particularly, in the case of a large machine with a heavy door), and therefore, a safety door automatic opening/closing device that makes use of an air cylinder is used frequently to reduce the labor and is installed in most large machines.

Figure 6:
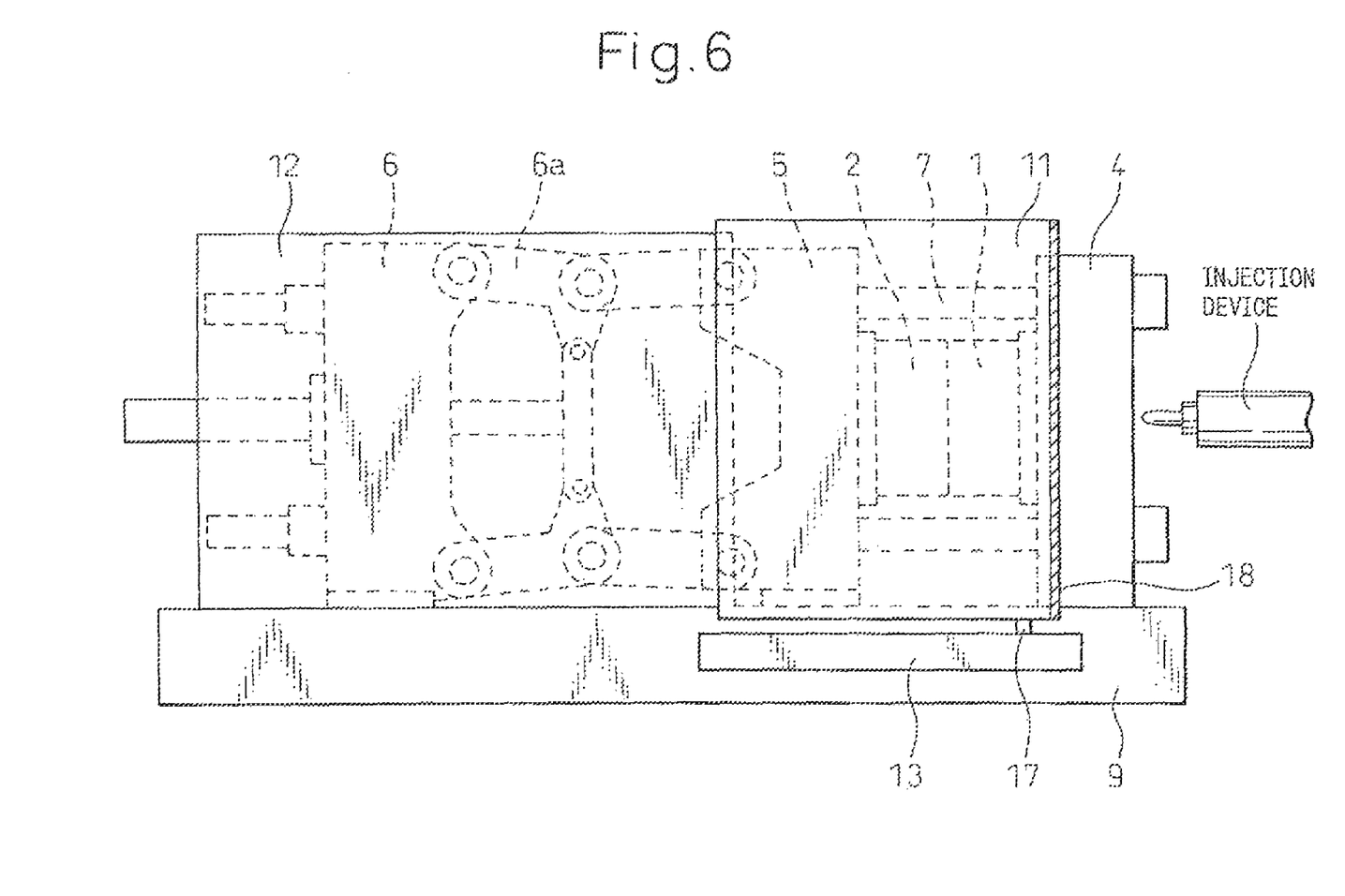
FIG. 6 is a diagram showing a state where a safety door that is operated by a conventional automatic opening/closing device is closed.

FIG. 6 shows a horizontal mold clamping device with a general toggle link mechanism, in which a safety door automatic opening/closing device is installed. On a machine base 9, a fixed platen 4 that holds a fixed mold 1 is fixed, and a movable platen 5 that holds a movable mold 2 is mounted movably on the left side thereof. Further, on the left side of the movable platen 5, a link housing 6 and a link mechanism 6a are provided, which open/close the movable platen 5 and exert a mold clamping force. On the right side of the fixed platen 4, an injection device is installed, which injects and fills plastic or aluminum in the molten state in the mold.

To the lateral side of the link housing 6 and the link mechanism 6a of the mold clamping device, a fixed door 12 is attached fixedly, which cannot be opened, except for maintenance, such as machine repair.

On the other hand, to the lateral side of the fixed mold 1, the movable mold 2, and the movable platen 5, a safety door 11 is attached and can be opened/closed in the transverse direction by the action of a wheel etc.

Further, under the safety door 11, an automatic opening/closing device 13 is attached to the machine base 9 and the safety door 11 can be opened/closed automatically (without the labor of an operator) via a coupling part 17. In the automatic opening/closing device 13, an air cylinder is used usually as a drive device, and the main body part of the air cylinder is fixed on the machine base 9 and at the same time, the coupling part 17 is attached to the tip end part of a cylinder rod and coupled with the safety door 11.

To the end surface on the side in the direction of travel of the safety door 11 in the closing operation, a touch switch 18 is attached. This is a safety device to prevent an operator who is still in the device from being sandwiched in the closing operation, and when electrically detecting contact with the operator in the closing operation, a controller operates an air valve, etc., to immediately stop the closing operation, and then subsequently changes the operation to the opening operation.

Figure 7:
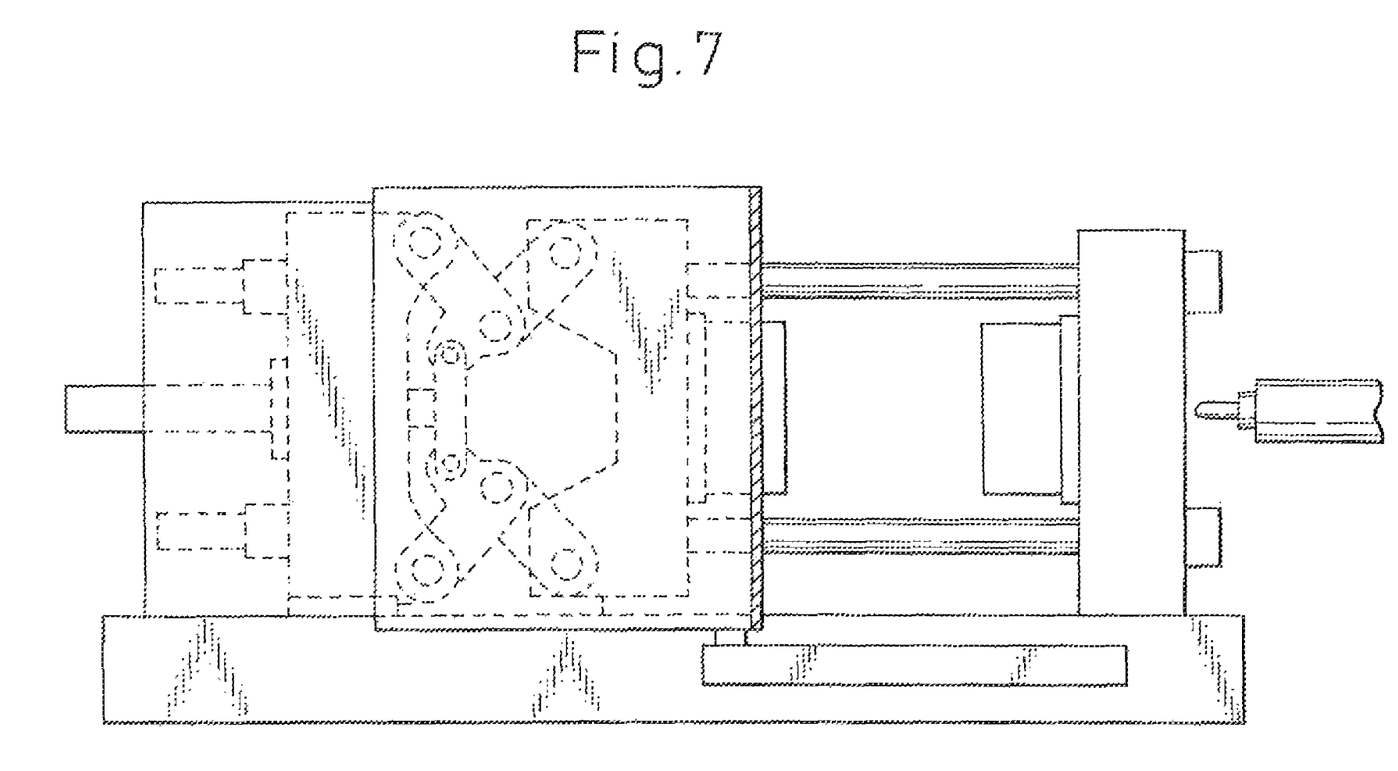
FIG. 7 is a diagram showing a state where a safety door that is operated by a conventional automatic opening/closing device is open (fully open).

FIG. 7 shows a state where the mold is open and the safety door 11 is fully open.

The opening/closing stroke of the safety door is determined to a length so that the safety door can be opened to a position where an operator can inspect and repair the cavity surface of the opened mold or the side surface of the mold when the molding operation comes to rest. Then, in designing the automatic opening/closing device, an air cylinder with a length that can realize this opening/closing stroke is selected.

Due to the characteristics of the air cylinder, it is difficult to stop the cylinder rod at a position set on the way of the stroke with high precision in an expanding/contracting operation of the cylinder rod. Because of this, it is difficult to stop the safety door at a position other than the fully opened position and the fully closed position of the safety door, where the cylinder rod is located on both the stroke ends. Consequently, in the molding process also, it is necessary to open the safety door to the fully opened position and close to the fully closed position (the entire stroke) for each cycle.

However, in order for an operator to take out a molded product in the molding cycle, it is only necessary that part of the body of the operator (arm, upper part of the body, etc.) can be put into the mold clamping device to grasp and carry out the molded product, and therefore, it is not necessary to open the safety door through the entire stroke. Further, also when a mold is carried in/out of the device using a mold set-up device (in the set-up process), the door needs to be open slightly wider than the width through which the closed mold can be passed, and therefore, it is not necessary to open the safety door through the entire stroke. In particular, the larger a molding machine is, the longer the excessive opening/closing stroke of the safety door is, and therefore, the wasteful time (waiting time) becomes longer.

Due to the above, an attempt has been made to shorten the cycle time and the set-up time by shortening the opening/closing operation stroke by stopping the operation on the way instead of opening through the entire stoke with an air cylinder.

As one of the methods, Patent Literature 1 discloses a method of adjusting the open position of a safety door in accordance with the amount of opening of a movable platen and a mold.

With this method, it is possible to electrically detect the relative position of the movable platen and the safety door by attaching a limit switch to the safety door and at the same time, attaching a dog to the movable platen. When an electric signal from the limit switch is detected during the opening operation of the safety door, the air valve is operated to limit the supply of air pressure to the air cylinder. Due to this, it is possible to reduce the speed of the opening operation of the safety door and stop the safety door at a position in accordance with the open position of the movable platen.

[Patent Literature] Japanese Unexamined Patent Publication (Kokai) No. 08-25448

However, with the method according to Patent Literature 1, although it is possible to determine an open position of the safety door in accordance with the amount of opening of the movable platen, it is necessary to manually adjust the position of the limit switch when desiring to further make a fine adjustment in accordance with the shape of the molded product. Further, it is necessary to attach another limit switch or dog in order to stop the safety door at a minimum necessary open position in the set-up process.

Next, in order to shorten the cycle time, it is necessary to open/close the safety door in a brief time both speedily and accurately. However, the operation by the air cylinder can be set to only two levels at the most, i.e., high speed and low speed, and it is difficult to freely set the speed, and control the speed and acceleration/deceleration (at the most, only the air throttle valve can be adjusted), and therefore, it is difficult to quickly open/close the safety door and shorten the cycle time thereby.

Further, in order to secure the safety of an operator, it is necessary to attach a touch switch to the end surface in the direction of travel at the time of the closing operation. However, if a touch switch is attached to the safety door, it is difficult to wire it to the controller and at the same time, the cost is increased.

SUMMARY OF INVENTION

Technical Problem

An object of the present invention is to provide a safety door automatic opening/closing device that is capable of freely (arbitrarily) setting and controlling the opening/closing speed and the open position and which does not require a touch switch, and a method of controlling the same.

Solution to Problem

In order to solve the above-mentioned problems, according to a first invention of the present invention, a safety door automatic opening/closing device is configured by an electric motor capable of feedback control and a rotational-linear motion converting mechanism, and it is possible to arbitrarily set and control the open position and the opening/closing speed of the safety door.

In a second invention, the rotational-linear motion converting mechanism in the first invention is a combination of a toothed belt and a pulley or a combination of a chain and a sprocket.

In a third invention, the rotational-linear motion converting mechanism in the first invention is a ball screw.

In a fourth invention, the safety door automatic opening/closing device in the first to third inventions is controlled so that the open position of the safety door that allows a molded product to be taken out is set and thus the opening/closing operation is controlled in a molding process.

In a fifth invention, the safety door automatic opening/closing device in the first to third inventions is controlled so that the open position of the safety door that allows a mold to be carried in and carried out and thus the opening/closing operation is controlled in a set-up process.

In a sixth invention, the safety door automatic opening/closing device in the first to third inventions is controlled so that a contact of the safety door with an operator or obstacle during the closing operation is detected by a torque load of an electric motor and the closing operation is stopped immediately.

ADVANTAGEOUS EFFECTS OF INVENTION

The present invention exhibits the following excellent effects.

(1) It is possible to arbitrarily set and accurately control the opening/closing speed pattern of the safety door, and therefore, it is possible to make an attempt to shorten the time required to open/close the safety door and to shorten the molding cycle time.

(2) It is possible to arbitrarily set and accurately control an open position of the safety door that allows a molded product to be taken out in the molding process, and therefore, it is possible to make an attempt to shorten the time required to open/close the safety door and to shorten the molding cycle time.

(3) It is possible to set and accurately control an open position of the safety door that allows a mold to be carried in and carried out in the set-up process, and therefore, it is possible to make an attempt to shorten the time required to open/close the safety door and to shorten the set-up time.

(4) It is no longer necessary to install a touch switch etc. configured to detect a contact of the safety door with an operator or obstacle during the closing operation of the safety door, and therefore, it is possible to reduce the cost and the burden of wiring work.

The present invention may be more fully understood from the description of the preferred embodiments of the invention set forth below, together with the accompanying drawings.

DESCRIPTION OF EMBODIMENTS

Figure 1:
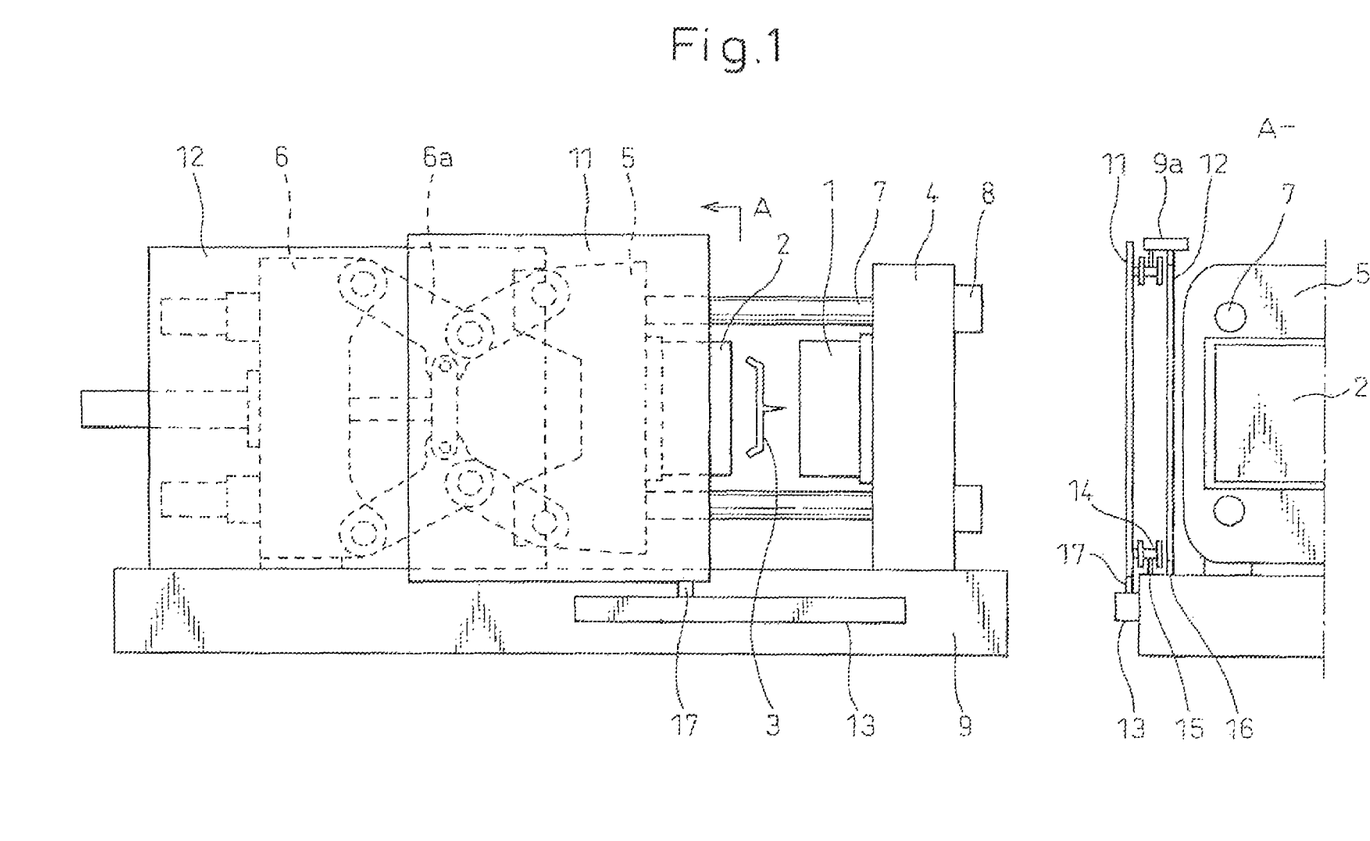
FIG. 1 shows a safety door, an automatic opening/closing device, a mold clamping device, etc., according to an embodiment of the present invention, and a diagram showing a state where the safety door is opened up to an open position that allows a molded product to be taken out.

Embodiments according to the present invention are explained below based on the drawings (FIG. 1 to FIG. 5).
Embodiments FIG. 1 shows the entire a mold clamping device comprising a safety door automatic opening/closing device according to the present invention. The embodiments of the present invention have the same basic structure as that of the prior art shown in FIG. 6 and FIG. 7, except that a touch switch is not attached to a safety door 11 and except for the configuration of an automatic opening/closing device 13.

The open position of a movable platen 5 and the open position of the safety door 11 in FIG. 1 are not a fully open position but a minimum necessary open position that allows a molded product 3 to be taken out, showing an open position without wasteful time required for the opening/closing stroke and operation, which enables the reduction in the cycle time.

A view A—in the direction of an arrow A on the right side shows a diagram when the safety door 11 etc. is viewed from the side. On the top surface of a machine base 9 and on the undersurface of a top part beam 9a (supported by a supporting part, not shown schematically), a safety door rail 15 and a fixed door rail 16 are fixed. A fixed door 12 is attached slidably (so that they can be opened/closed) between the upper and lower fixed door rails 16, however, usually, it is not necessary to open/close the fixed door 12, and therefore, it is fixed. On the other hand, the safety door 11 is attached slidably (so that they can be opened/closed) to the safety door rail 15 via a wheel 14 and at the same time, coupled with the automatic opening/closing device 13 via a coupling part 17, and thus, automatic opening/closing operation of the safety door 11 is enabled.

Figure 2:
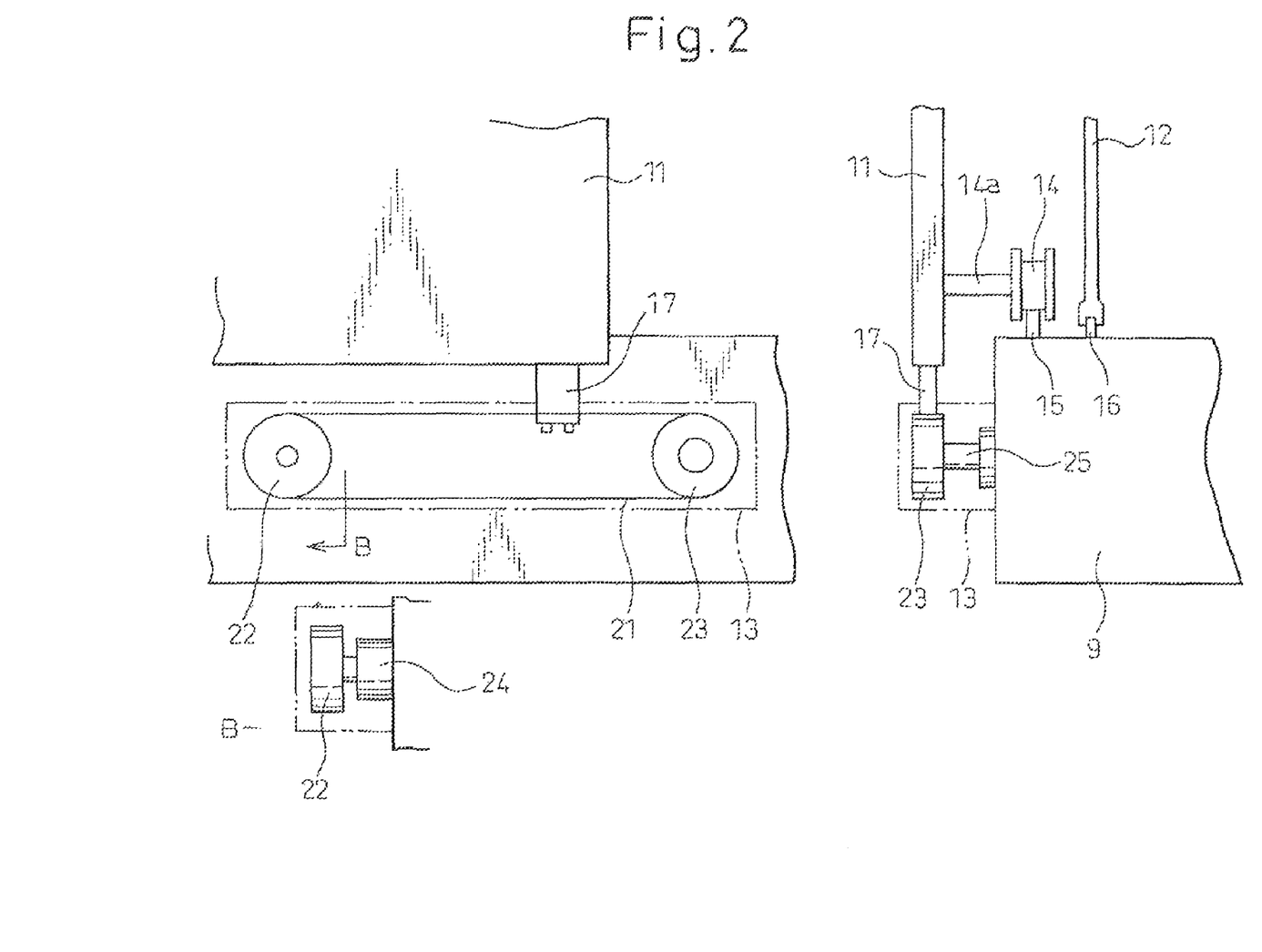
FIG. 2 is a diagram showing an automatic opening/closing device configured by a servomotor, a toothed belt, and a pulley according to an embodiment of the present invention.

FIG. 2 shows a configuration of the automatic opening/closing device 13 according to the embodiment of the present invention. As shown in the diagram on the right side, the wheel 14 rests on the lower safety door rail 15 and the wheel 14 is attached rotatably via a wheel shaft 14a fixed on the safety door 11 and a bearing. By the rolling of the wheel 14 on the safety door rail 15, a smooth opening/closing operation of the safety door 11 is enabled.

The automatic opening/closing device 13 is configured by a rotational-linear motion converting mechanism including a servomotor 24, a drive pulley 22, a driven pulley shaft 25, a driven pulley 23, and a toothed belt 21. The servomotor 24 and the driven pulley shaft 25 are attached to the side surface of the machine base 9. On the rotational shaft of the servomotor 24, the drive pulley 22 is fixed and to the driven pulley shaft 25, the driven pulley 23 is attached rotatably via a bearing. Around the drive pulley 22 and the driven pulley 23, the toothed belt 21 is wound and the toothed belt 21 is coupled with the safety door 11 by the coupling part 17.

Due to the above, when the servomotor 24 is rotated, the drive pulley 22 and the driven pulley 23 rotate and accompanying this, the toothed belt 21, the coupling part, and the safety door 11 move linearly in the transverse direction (opening/closing operation). Then, by controlling the rotation speed and the amount of rotation of the servomotor 22, it is possible to control the opening/closing speed and the open position of the safety door 11.

In FIG. 2, even if the toothed belt 21 is replaced with a chain, the drive pulley 22 with a drive sprocket, and the driven pulley 23 with a driven sprocket, it is also possible to embody the present invention in the same way.

Figure 3:
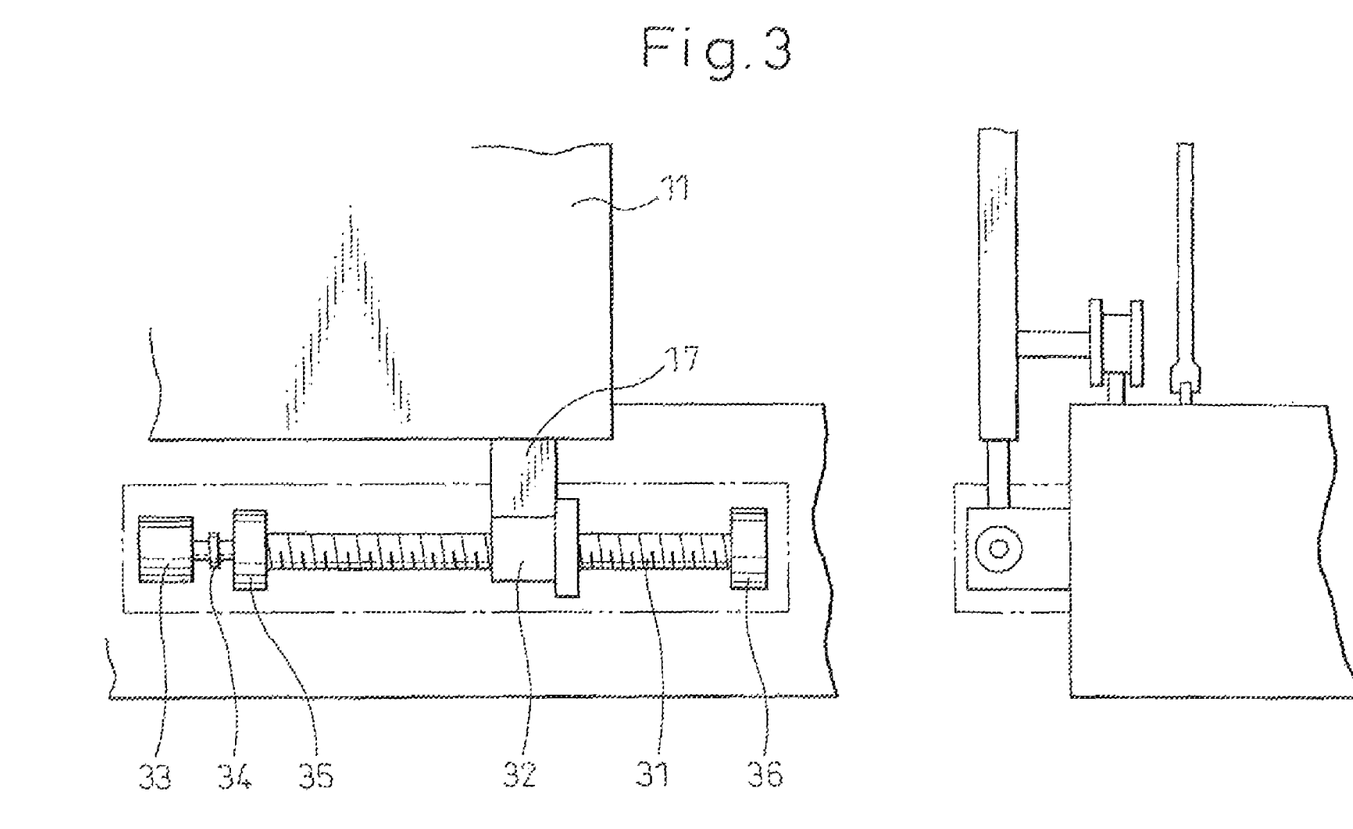
FIG. 3 is a diagram showing an automatic opening/closing device configured by a servomotor, a ball screw, etc., according to an embodiment of the present invention.

The next embodiment is explained using FIG. 3. The automatic opening/closing device 13 is configured by a rotational-linear motion converting mechanism including a servomotor 33, a ball screw shaft 31, etc.

On the side surface of the machine base 9, the servomotor 33, a thrust bearing 35, and a radial bearing 36 are fixed via an attaching part. The ball screw shaft 31 is supported rotatably by the thrust bearing 35 and the radial bearing 36 and at the same time, the movement thereof in the direction of shaft (direction of thrust) is regulated by the thrust bearing 35. The end part on the side of the thrust bearing 35 of the ball screw shaft 31 is coupled with the rotational shaft of the servomotor 33 via a coupling 34. To the ball screw shaft 31, a ball screw nut 32 is screwed and the ball screw nut 32 is coupled with the safety door 11 via the coupling member 17.

Due to the above, when the servomotor 33 rotates, the ball screw shaft 31 and the ball nut 32 convert the rotational motion into a linear motion, and thereby, the safety door 11 can be opened/closed.

Figure 5:
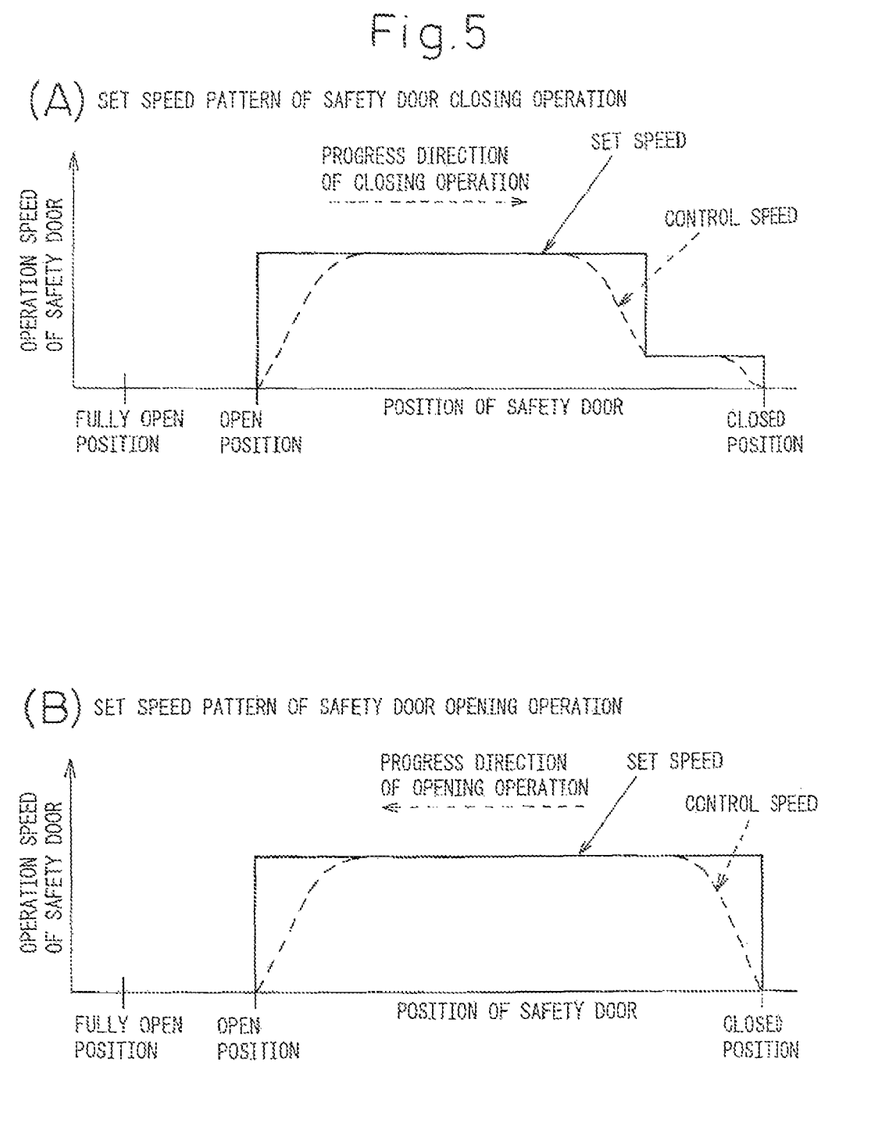
FIG. 5 is a diagram showing a set speed pattern etc. of the opening/closing operation of the safety door according to an embodiment of the present invention.

Next, a method of controlling an opening/closing operation using the safety automatic opening/closing device described above is explained A person in charge of setting the operation conditions sets the open position and the speed pattern of the closing operation and the opening operation to the operation panel of the molding machine as shown in FIG. 5.

First, an open position of the safety door suitable for the working of an operator to take out a molded product from an open mold is determined (so that the opening/closing stroke is as short as possible). Then, while testing the opening/closing operation, a speed pattern that makes the operation smooth and the operation time short is set. It is recommended to set the speed pattern of the closing operation to a two-level speed pattern, in which the speed is reduced when the door approaches the closed position to prevent an operator from being caught in the door, as shown in the upper graph in FIG. 5. The opening operation may be a fast one-level speed pattern as shown in the lower graph.

Based on the speed pattern set as above, the controller of a molding machine controls the opening/closing operation via a servomotor, however, in the actual control, as shown by the broken line in the graph, the acceleration area and the deceleration area are provided for a smooth operation by preventing a shock from occurring. Further, a rotary encoder is incorporated in the servomotor, and therefore, it is possible to perform accurate feedback control by detecting the rotation speed and the rotation angle of the rotational shaft and converting them into the operation speed and position of the safety door without the need to provide another sensor.

When the speed of the servomotor is controlled, if it comes into contact with an obstacle that impedes the operation, a torque load (motor current) is increased. By detecting the increase in torque load, it is possible for the controller to recognize the contact with an operator, etc., during the closing operation and to quickly stop the servomotor and the safety door (it may also be possible to start the opening operation immediately after stopping the safety door). Due to this, it is possible to secure the safety of an operator without the need to attach a touch sensor to the safety door.

It is also possible to replace the configuration by the servomotor and the rotational-linear motion converting mechanism with that by a linear motor (a linear encoder is also attached).

Hereinafter, the operation in the molding process and set-up process and a control method are explained.

Before the molding process is started, an operator checks for foreign matter or stain in the cavity etc. in the state where the mold and the safety door are open. When it is confirmed that molding can be performed, the operator presses the operation start button and the molding process is started.

First, the safety door is closed based on the speed pattern set as described above. When the controller confirms that the safety door stops at the closed position through the encoder of the servomotor, the movable platen moves and the mold is closed, and the mold clamping force is exerted. Plastic or aluminum in the molten state is injected from an injection device to fill the cavity and after the material is cooled and solidified, the mold is opened. After that, a molded product is removed from the movable mold by an extruder. Then, the safety door is opened and the operator takes out the molded product. Then, the operation start button is pressed again and the next molding cycle starts (it is also possible to simultaneously perform the operation to open the mold, the operation to remove the molded product, and the operation to open the safety door).

It is also possible to automatically perform the operation to take out the molded product using a robot, and in such a case, when a signal indicative of that the molded product has been taken out is received from the robot, the controller starts the next molding cycle (the molding cycle is fully automated).

As described above, the time required to open/close the safety door is added to the cycle time of molding, and therefore, if the opening/closing stroke of the safety door (determined by the open position) is made as short as possible and controlled at further higher speed and with higher precision, the cycle time can be shortened directly. Then, this contributes to improvement of productivity.

In the automatic set-up process in which a mold is replaced with another, after the safety door is closed, the mold is closed (mold clamping force is not exerted), and the clamp between the fixed platen and the movable platen is released. Then, the movable platen is opened slightly (for example, 50 mm) and the contact between the mold and the respective platens is cancelled. Next, the safety door is opened to an open position somewhat wider than the mold attachment surface of the movable platen (for example, 30 mm). The open position of the safety door at this time can be calculated by the controller from the data, such as the thickness of the mold, input to the operation panel.

Figure 4:
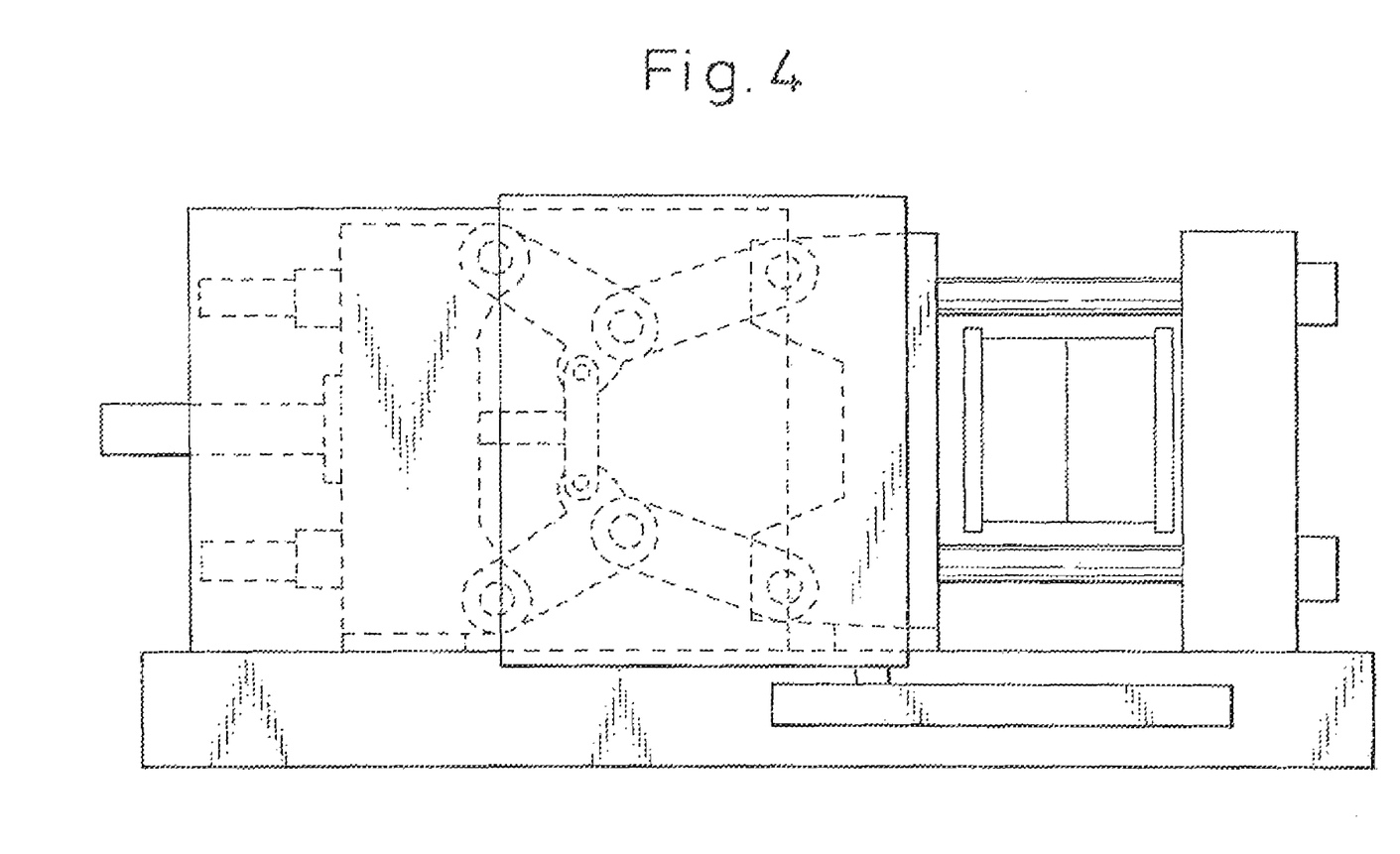
FIG. 4 is a diagram showing a state where the safety door is opened to an open position that allows a mold to be set up according to an embodiment of the present invention.

FIG. 4 shows an open position of the safety door in the set-up process and the mold is carried out to the front side by a set-up device, not shown schematically (a device that clamps the mold is also not shown schematically).

After the mold is carried out, the movable platen is opened to an open position slightly wider than the thickness of the next mold (for example, 50 mm) and the safety door is opened to an open position corresponding thereto. Then, when the next mold is carried into the molding machine, the movable platen moves in the direction of the closed side, the mold and the respective platens come into contact, the mold is clamped, and then, the mold is opened and the safety door is also opened. Then, preparation for the next molding is done.

Due to the above, in the set-up process also, setting the amount of opening of the safety door as small as possible and controlling the operation contribute to the reduction in the set-up time.

The above-mentioned embodiments are examples of the present invention and the present invention is not limited to the embodiments but specified only by the matters described in claims, and embodiments other than the above-mentioned embodiments can be embodied.

For example, the electric motor is not limited to the servomotor and any motor may be used, as long as it can perform feedback control based on the position detection.

While the invention has been described by reference to specific embodiments chosen for the purposes of illustration, it should be apparent that numerous modifications could be made thereto, by those skilled in the art without departing from the basic concept and scope of the invention.

The invention claimed is:

1. A safety door automatic opening/closing device in an injection molding machine or die cast machine, comprising:
    an electric motor equipped with an encoder capable of feedback control; a controller for controlling the operation of the electric motor; and
    a rotational-linear motion converting mechanism connected to the electric motor, wherein
       an open position and opening/closing speed of a safety door can be arbitrarily set and controlled.

2. The safety door automatic opening/closing device according to claim 1, wherein
    the rotational-linear motion converting mechanism is a combination of a toothed belt and a pulley or a combination of a chain and a sprocket.

3. The safety door automatic opening/closing device according to claim 1, wherein
    the rotational-linear motion converting mechanism is a ball screw.

4. A method of controlling the safety door automatic opening/closing device according to claim 1, comprising the step of setting an open position of a safety door that allows a molded product to be taken out and controlling the opening/closing operation in a molding process.

5. A method of controlling the safety door automatic opening/closing device according to claim 1, comprising the step of setting an open position of a safety door that allows a mold to be carried in and carried out and controlling the opening/closing operation in a set-up process.

6. A method of controlling the safety door automatic opening/closing device according to claim 1, comprising the step of detecting a contact of a safety door with an operator or obstacle during the period of closing operation by a torque load of the electric motor and immediately stopping the closing operation.

* * * * *